April 11, 1967     H. L. GERBER ETAL     3,313,906
WELDING METHOD
Filed Oct. 14, 1964
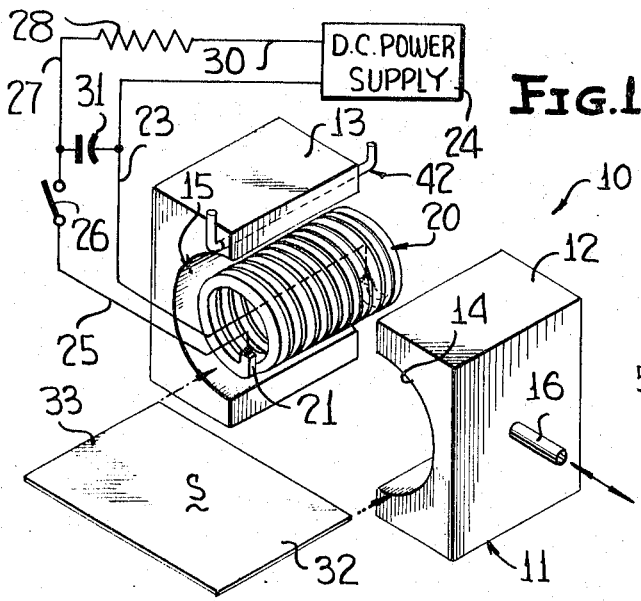
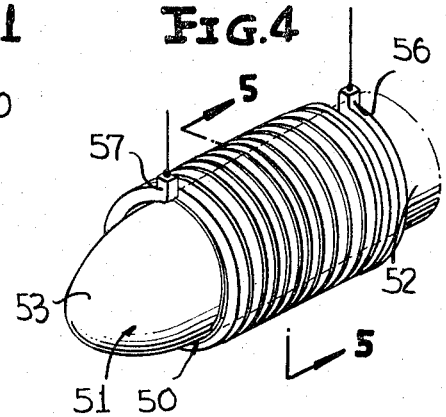
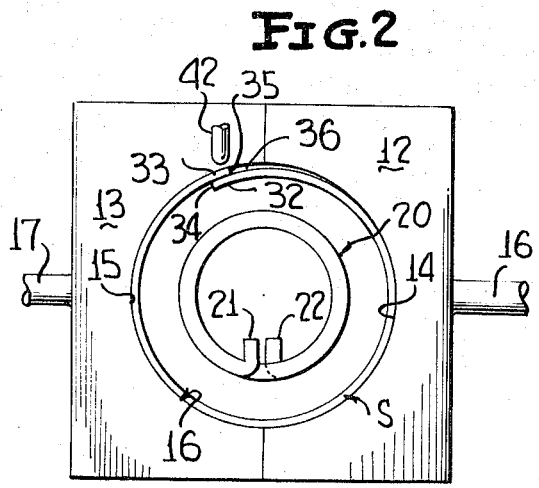
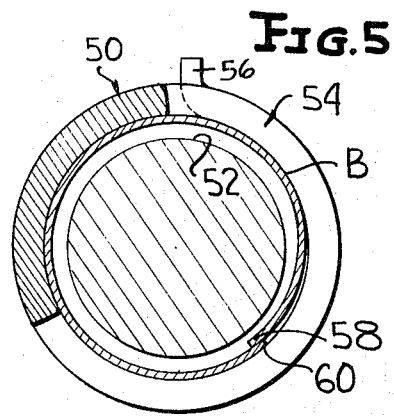
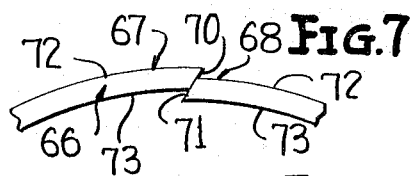
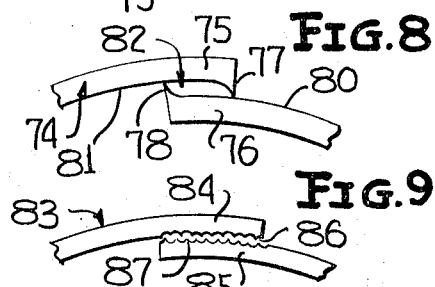
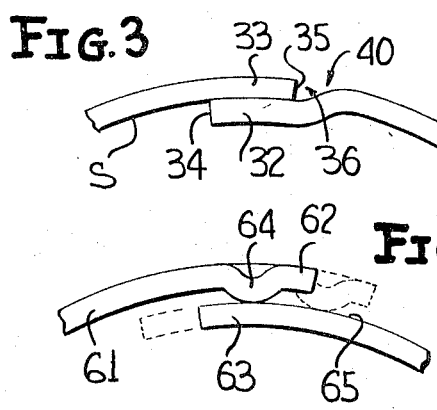
INVENTORS
HOWARD L. GERBER
& PAUL M. ERLANDSON
BY Mason, Porter, Diller & Stewart
ATTORNEYS

United States Patent Office 3,313,906
Patented Apr. 11, 1967

3,313,906
WELDING METHOD
Howard L. Gerber, Chicago, and Paul M. Erlandson, Palos Park, Ill., assignors to Continental Can Company, Inc., New York, N.Y., a corporation of New York
Filed Oct. 14, 1964, Ser. No. 403,859
20 Claims. (Cl. 219—8.5)

This invention relates to a novel method of welding metallic articles, and more particularly, to a novel method of welding edge portions of a metallic sheet member formed into a generally tubular configuration by subjecting the metallic sheet member to an energy field of sufficient intensity to induce current flow in the member through an area of high resistance to current flow defined by the edge portions whereby the edge portions become heated and fuse together.

The invention is directed primarily to the art of manufacturing can bodies, and provides a novel method of welding can bodies in a heretofore undisclosed manner which overcomes numerous disadvantages in prior art can body manufacturing methods and apparatuses.

At present it is customary to form can bodies from flat tinplate body blanks which are generally bottom-fed from a feed hopper of a conventional body maker. Each can body blank is advanced from the feed hopper to a rolling station where it is bent around a small diameter roll to break the tension or springiness in the tinplate.

The side edges of each can body blank are then knurled, notched and subsequently folded into oppositely directed inside and outside hooks. At a forming station forming wings form each body blank around a forming horn to a generally tubular shape, and engage the inside and outside hooks. A bumper steel then locks the hooks. The can body is then preheated and passed over a solder roll which transfers molten solder from a solder pot to the locked can body side seam. Excess solder is removed after the can body passes beyond the solder pot, and the can body is thereafter cooled to solidify the solder.

From the above, it is apparent that between the time each body blank departs the rolling station until the side seam is solidified, numerous operations are performed on the body blank to insure the formation of an efficient side seam, and several operations are not only time consuming, but the removal of metal during the notching operation and the application of the solder are operations which increase the cost of manufacturing because of the respective material losses and additions.

It is, therefore, an object of this invention to provide a novel method of welding an article, particularly a can body, in a manner which eliminates most of the foregoing disadvantages inherent in conventional welding methods and produce several advantages unprovided for by such prior art methods.

In accordance with this invention a can body blank which is neither notched nor has hooked edge portions is formed to a generally tubular configuration with the edge portions in overlapping or edge butting contact by, for example, the forming wings and horn of a conventional body maker. The horn accommodates a coil or a coil can be provided as an extension of the conventional body maker horn. After the can body blank is thus formed, the coil is energized from a suitable source of high frequency electrical energy. This energization of the coil establishes a magnetic field and induces current flow in the cam body across the edge portions thereof. Since the edge portions of the can body are of a higher electrical resistivity than the cross section of the blank, the induced current flow heats the edge portions more than the remainder of the can body and the heating is sufficient to cause melting of the metal at the edge portion interfaces. The magnetic field also interacts with the induced current in the can body to cause the blank to be acted upon by radially outwardly directed forces which repel the blank away from the coil and against the forming wings. These forces are sufficient to forge the heated edge portions into a weld which, upon cooling and solidification, forms the seam area of the completed can body.

In addition to overcoming the conventional prior art steps of notching, knurling, forming inside and outside hooks, engaging the hooks, locking the hooks, applying solder to the seam and thereafter wiping the formed seam, the above disclosed method also eliminates many disadvantages of other prior art welding methods. For example, in the disclosed method a single current pulse of sufficient magnitude performs the functions of heating the can blank edge portions to forging temperature and establishes the magnetic field which reacts with the induced current in the can body to apply the necessary forging pressure. In conventional forge welding, it is generally necessary to provide a pair of opposed forge rolls which apply forging pressure to the article being welded, generally a tube, while separate heating means are used to heat the edge portions to forging temperature.

A further object of this invention is to provide a novel method of welding edge portions of a metallic sheet in the manner described, and in addition, to maintain the overlapping or abutting edge portions spaced from the forming wings or similar forming devices prior to energizing the coil whereupon energization of the coil, the radially outwardly directed forces drive the edge portions toward and against the wings resulting in an increase in the forging pressure dependent upon the velocity of the edge portions at the time of impact.

A further object of this invention is to provide a novel method of welding edge portions of a metallic sheet or blank in the manner just described and in addition, exerting most of the forging pressure against the metallic sheet after the current has been induced across the interfaces of the edge portions whereupon lower resistance, greater heating of the edge portions and a more efficient weld is obtained as compared to a similar weld formed by the simultaneous heating and forging of the edge portions.

A further object of this invention is to provide a novel method of welding edge portions of a metallic sheet by positioning a metallic sheet of a generally tubular configuration in either external telescopic relationship to a support and in internal telescopic relationship to a coil or in internal telescopic relationship to a support and in external telescopic relationship to a coil with opposite edge portions of the sheet in each case being in opposed contacting relationship, and passing an electrical impulse through the coil of a magnitude sufficient to establish a force which urges the sheet against the support with the edge portions in intimate pressure contact and also induces an electrical impulse in the sheet passing between contacting interface surfaces of the edge portions with the contacting edge portions being thus heated and pressure-fused together.

A further object of this invention is to provide a novel method of welding edge portions of a metallic sheet by positioning a metallic sheet of a generally tubular configuration in external telescopic relation relative to a support and in internal telescopic relationship to a coil with opposite edge portions of the sheet in opposed spaced relationship, and passing an electrical impulse through the coil of a magnitude sufficient to establish a force which urges the sheet against the support and the edge portions thereof in intimate contact and also induces an electrical impulse in the sheet passing between contacting surfaces of the edge portions to heat and forge weld the edge portions.

A further object of this invention is to provide a novel method of forge welding a metallic sheet including each of the steps described and in addition, performing the step of preheating the edge portions to increase the electrical resistance of the edge portions and also conserve the applied current.

With the above and other objects in view that will hereinafter appear, the nature of the invention will be more clearly understood by reference to the following detailed description, the appended claims and the several views illustrated in the accompanying drawing:

In the drawing:

FIGURE 1 is a schematic perspective view of an apparatus for performing the novel method of this invention and illustrates a coil positioned in coaxial spaced relationship to a cavity of a sectional mold, and a flat metallic blank prior to being introduced between the coil and the cavities of the split mold.

FIGURE 2 is an axial end view of the apparatus of FIGURE 1 after the split mold has been closed, and illustrates the blank in tubular form with overlapped edge portions prior to welding the same to form a seam.

FIGURE 3 is a highly enlarged fragmentary end view of the overlapped portions of the tubular blank of FIGURE 2, and illustrates the completed forge weld at the overlapped edge portions of the tubular blank.

FIGURE 4 is a top perspective view of another apparatus of this invention and illustrates a tubular blank having lapped end portions surrounding a horn and a coil telescopically surrounding the tubular blank.

FIGURE 5 is an enlarged sectional view taken along line 5—5 of FIGURE 4, and more clearly illustrates the generally coaxial relationship of the horn, the tubular blank and the coil of FIGURE 4.

FIGURE 6 is a highly enlarged fragmentary axial end view of overlapped edge portions of another tubular blank, and illustrates a projection formed in an outermost one of the edge portions.

FIGURE 7 is a highly enlarged fragmentary end view of another tubular member, and illustrates beveled edges of the tubular member in butting contact.

FIGURE 8 is a highly enlarged fragmentary end elevational view of another tubular blank or member constructed in accordance with this invention, and illustrates opposed edge portions of the tubular member in line contact.

FIGURE 9 is another highly enlarged fragmentary end elevational view of edge portions of another tubular blank, and illustrates opposed knurled surfaces thereof in face-to-face contact.

An apparatus constructed in accordance with this invention is best illustrated in FIGURES 1 and 2 of the drawing, and is generally referred to by the reference numeral 10. The apparatus 10 comprises a split mold 11 formed of a pair of substantially identical mold bodies 12 and 13 having respective substantially semi-cylindrical opposed surfaces 14, 15 defining a generally cylindrical cavity 16 (FIGURE 2). The mold bodies 12 and 13 are mounted for relative reciprocal movement in the direction of the double headed arrow of FIGURE 1. Conventional means (not shown) such as one or more fluid operated pistons (also not shown) having piston rods 16, 17 are secured to the respective mold bodies 12 and 13. By introducing and withdrawing hydraulic fluid into and out of the cylinders in a well known manner, the piston rods 16, 17 and the respective mold bodies 12 and 13 can be reciprocated between the positions illustrated in FIGURES 1 and 2 of the drawings.

While the mold bodies 12 and 13 are illustrated as being reciprocally movable relative to each other, the same can be supported for relative pivoting movement about a common shaft (not shown) preferably journalling the upper portions of the mold bodies in much the same manner as are journalled for forming wings of conventional body makers, as was heretofore noted. Upon such a construction, the lower portion of the mold body 12 as viewed in FIGURE 2 would pivot counterclockwise while the lower portion of the mold body 13 would pivot clockwise as viewed in the same figure to open the mold 11. A reversal of these directions would, of course, similarly close the mold.

A coil 20 formed of conductive material is positioned in coaxial spaced relationship to the surfaces 14, 15 defining the mold cavity 16 of the apparatus 10, as is best illustrated in FIGURE 2 of the drawing. As was heretofore noted, the coil 20 can form a portion of a conventional forming horn of a body maker or form an extension thereof, and can be supported in the position illustrated in FIGURES 1 and 2 by a conventional body maker horn support bracket (also not shown). The coil 20 is of a multi-turn construction, and terminates at opposite end portions thereof in upwardly directed leads 21 and 22. The lead 22 is connected by a conductor 23 (FIGURE 1) to a suitable direct current supply of electrical power which is generally designated by the reference numeral 24. The lead 21 is similarly connected to the power supply 24 by a conductor 25, a switch 26, another conductor 27, a charging resistor 28 and a conductor 30. A storage capacitor 31 is connected to the conductors 23 and 24 in parallel with the coil 20.

A metallic sheet or member S, such as a tinplate or aluminum can body blank, having opposite edge portions 32 and 33 which are generally in parallel relationship is conveyed by conventional conveying means toward the apparatus 10 when the same is open (FIGURE 1). When the sheet S is located between the mold bodies 12 and 13, the mold 11 is closed by relative movement of the piston rods 16, 17 toward each other in the manner heretofore described. As the mold bodies 12 and 13 approach each other, the surfaces 14 and 15 contact the respective edge portions 32 and 33 of the metallic sheet S and guide the same into overlapping relationship (FIGURE 2) whereupon the metallic sheet S is contoured to a generally tubular configuration, as is best illustrated in FIGURE 2 of the drawing. During this forming of the sheet S opposed edges 34, 35 of the respective edge portions 32, 33 may abut one another and prevent the overlap of the edge portions 32, 33 shown in FIGURE 2. To avoid such abutment between the edges 34 and 35, either or both of the edges 34, 35 can be beveled or rounded to facilitate the riding of one edge portion over the other to form the overlap of FIGURE 2. Furthermore, while the edge portion 33 is illustrated as being outermost relative to the axes of the cavity 16, the coil 20 and the tubular sheet S, the edge portion 32 can as well form the outermost portion of the overlap between the portions 32 and 33.

The tubular metallic sheet S is, for the most part, pressed against the surfaces 14, 15 of the cavity 16 by virtue of the inherent tendency of the relatively flexible and springy material thereof to return or rebound toward the generally flat planar configuration shown in FIGURE 1. A slight semi-crescent shaped gap 36 does, however, exist between the outermost surface of the tubular sheet S adjacent the overlapped edge portions 32 and 33.

With the tubular sheet S positioned as shown in FIGURE 2 of the drawing, the switch 26 (FIGURE 1) is closed. This short-circuits the capacitor 31 through the coil 20 and the current passing through the coil establishes a magnetic field and induces a generally circumferential flow of current in the tubular sheet S opposite to the direction of current flow in the coil 20. The coil 20 and the tubular sheet S are analogous to a pair of conductors carrying current in opposite directions with the magnetic field exerting radially outwardly directed repelling forces against the tubular sheet S of a predetermined magnitude depending upon the field intensity. These repelling forces urge the tubular sheet S into intimate engagement with the surfaces 14, 15 of the cavity 16 at substantially the same time that the interface between the lapped end portions 32, 33 of the tubular sheet S are heated by the induced current flowing through the tubular sheet S. Since the lapped edge portions 32, 33 of the tubular sheet S are greater in combined cross section than the remainder of the tubular sheet S, the electrical resistivity of the lapped edge portions 32, 33 is relatively greater than the remainder of the sheet and are thus heated to a sufficient temperature to cause melting of the metal. This melting and the pressure exerted by the repelling forces against the tubular sheet S forge the lapped edge portions 32, 33 into a weld or seam.

After a relatively short period of time the current flow in the coil 20 and that induced in the tubular sheet S decays whereupon the molten metal at the interface of the edge portion 32, 33 cools and solidifies. This solidification occurs prior to the complete collapse of the magnetic field and the repelling forces maintain the edge portions 32, 33 in intimate pressure contact during and after the solidification of the metal. The mold bodies 12 and 13 of the mold 11 are then opened to the position shown in FIGURE 1 and the welded tubular sheet S is conveyed or discharged therefrom.

The forge weld produced by the apparatus 10 is best illustrated in FIGURE 3. With particular attention directed to FIGURE 3, it will be noted that an area of metal 40 adjacent the edge portion 32 of the welded tubular sheet S is offset radially outwardly as compared to the same area (unnumbered) of the sheet prior to the formation of the weld (FIGURE 2) and the gap 36 prior to the welding operation is substantially reduced at the completion of the welding operation, (FIGURE 3). The gap 36 of FIGURE 3 is highly exaggerated and in practice is relatively minimal. The offset portion 40 is caused by the repelling forces during the operation just described, and serves to maintain the outside surface (unnumbered) of the welded tubular sheet S (FIGURE 3) substantially flush except for the minimal gap 36 of FIGURE 3.

Various modifications in the apparatus of FIGURES 1 and 2, as well as the method described, are considered to be within the scope of this disclosure. For example, means 42 (FIGURE 1) such as an electrode, can be conventionally mounted in the mold body 13 of the mold 11 adjacent the overlapped edge portions 32, 33 (FIGURE 2), and extends the full length of these overlapped edge portions. The means 42 can be connected to the power supply 24 in a conventional manner. The electrode 42 could be energized prior to or simultaneously with the closing of the switch 26 to rapidly pre-heat the lapped edge portions of a sheet to be welded in the apparatus 10. This pre-heating would not only conserve the current impulse or pulse during the welding operation, but would also increase the electrical resistance through the overlapped edge portions of the sheet and thus provide a higher welding temperature for the same current flow through the coil 20. Other means for pre-heating the element to be welded, such as an arc or an equivalent energy source, may be employed in lieu of the electrode 42.

By the same token, the forging pressure exerted on the overlapped edge portions 32, 33 of the tubular sheet S can be increased by supporting the tubular sheet S in the cavity 16 of the mold 11 in such a manner that the overlapped edge portions 32 and 33 are spaced from the surface 15. For example, the sheet S can be first formed to a tubular configuration prior to being inserted in the cavity 16 of the mold 11, and the overlap between the edge portions 32, 33 could be increased beyond the overlap illustrated in FIGURE 2. The diameter and circumference of the tubular sheet S is thus progressively decreased by increasing the overlap of the edge portions 32, 33 whereby the area of contact between the exterior surface (unnumbered) of the tubular sheet S and the surfaces 14, 15 of the cavity 16 progressively decreases. This tubular sheet can then be inserted in the mold 11 of the apparatus 10 by telescoping the same between the coil 20 and the surfaces 14, 15 with the mold bodies in either the opened or closed positions thereof. The edge portions corresponding to the edge portions 32, 33 of the tubular sheet S are, in this case, spaced from the surface 15 adjacent the electrode 42, and the sheet is supported only at its lowermost portion.

The switch 26 is closed and a weld is produced in substantially the same manner as that heretofore described with one major exception. Since a space or gap exists between the overlapped edge portions of the tubular sheet, corresponding to the edge portions 32, 33 of FIGURE 2, and the mold cavity 16, the repelling forces drive the overlapped edge portions across this gap at a predetermined velocity which results in an impact force when the outermost of the lapped edge portions contact the cavity 16. This impact force results in an increase in the forging pressure, but more important, while the force is applied to the overlapped edge portions at the same time current is induced in the tubular sheet a finite time is required for the overlapped edge portions to contact the cavity surfaces. Thus, during the initial discharge of the capacitor 31, the induced current flowing in the tubular sheet heats the overlapped edge portions and for the most part, the forging pressure is exerted after the current has been induced in the tubular sheet. Thus, a higher resistance results as compared to the simultaneous application of forging pressure and induced current flow, and more heating and melting of the overlapped edge portion interfaces thus results.

Successful welds have been produced in accordance with the latter-described method by first forming aluminum sheets to a generally tubular configuration with lapped edge portions and inserting the tubular sheet between an internal coil and an external mold cavity with the lapped portions spaced approximately 0.06 inch from the surface of the mold cavity. A current pulse having a decay time of 400 microseconds was then applied to a coil corresponding to the coil 20 of FIGURES 1 and 2. For consistently good welds the forging force was applied shortly after the first half cycle of the current pulse (in this case alternating current) which was approximately 100 microseconds. The average velocity of the lapped edge portions during the displacement across the 0.06 inch gap ranged between 200 to 500 inches per second. The application of the forging force thus ranged between approximately 120 to 300 microseconds after the initiation of the current pulse. Solidification occurred at approximately 200 microseconds i.e., within the range of the applied forging force. In this manner the lapped edge portions of the tubular aluminum sheet were heated prior to the application of the forging force, including the impact force of the lapped edge portions, and the solidification occurred prior to the termination of the applied forging force. While this example of resistance welding may be considered typical of the temperature and force relationships relative to time, the only requirement of the system is that the forging force be applied after the first half cycle of current and before solidification of the molten pool to achieve efficient resistance welding of the edge portions. For forge welding, the force or pressure is applied when the forging temperature of the particular metal is reached.

Another apparatus constructed in accordance with this invention is illustrated in FIGURES 4 and 5 of the drawings, and is generally designated by the reference numeral 50. The apparatus 50 comprises a conventional body maker horn 51 having a generally cylindrical body 52 terminating in a rounded end portion 53 which facilitates the telescopic insertion of a metallic sheet, such as a can body blank B between the surface 52 and the interior (unnumbered) of a coil 54. The coil 54 corresponds to the coil 20 and is energized by an electrical system corresponding to the system of FIGURE 1, by for example, connecting the conductors 23, 25 to terminal portions 56, 57, respectively of the coil 54.

The operation of the apparatus 50 is substantially identical to the operation of the apparatus 10 except that the oppositely directed current pulses in the coil 54 and the tubular sheet or blank B establish radially inwardly directed forces which act against the outer surface of the blank B and urge the same inwardly against the surface 52 of the horn 51. Overlapped edge portions 58, 60 of the blank B are thus heated across the interfaces thereof and are forcibly urged against the surface 52 to form a weld upon the decay of the current and the solidification of the metal. The edge portions 58, 60 of the tubular sheet or blank B are overlapped only slightly since the radially inwardly directed forces reduce the diameter and circumference of the tubular blank and thus increase the area of contact between these edge portions, as compared to the increase in diameter and circumference of the tubular sheet S which results in a decrease of the overlap between the respective edge portions 32, 33.

In both the apparatus 10 and the apparatus 50, the tubular sheets S and B, respectively, are right circular cylinders. However, by tapering the sheets S and B and the respective cavity 16 and horn 51, conically shaped nestable tubular members can be welded in accordance with each of the methods heretofore described.

The apparatus 50 of FIGURES 4 and 5 is particularly adapted for tacking longitudinally spaced areas of the edge portions 58, 60 of the blank of metallic sheet B, particularly in the manufacture of can bodies on conventional body makers of the type described to achieve accurate registration of the edge portions prior to a complete welding of these portions. For example, a metallic can body blank 61 of FIGURE 6 can be formed to a generally tubular configuration by conventional forming wings of a conventional body making machine (not shown) with edge portions 62, 63 thereof in lapped or overlapping relationship. The edge portions 62, 63 are preferably overlapped to the phantom outline position of FIGURE 6, and the inherent springiness or tendency of the metallic material to rebound after the removal of the forming forces exerted by the forming wings causes the return of the overlapped portions from the phantom outline position to the solid line position shown in FIGURE 6. The edge portion 62 is preferably provided with a plurality of axially spaced projections 64 bottoming against an exterior surface 65 of the blank 61 medially of the overlapped edge portions 62, 63. Similar projections (not shown) can be provided in the edge portion 63 in lieu of the projections 64 of the edge portion 62, or such projections can be provided in both of the edge portions 62, 63. In the latter construction of the blank 61 the projections formed in the edge portions 62, 63 are preferably axially offset so that a projection in either edge portion bottoms against a surface of the other of the edge portions between a pair of projections formed in this other projection. This construction provides a plurality of alternately opposing axially spaced projections along the length of the blank 61.

The tubular blank 61 is then conventionally advanced to a position corresponding to the position of the tubular sheet B of FIGURES 4 and 5 after which a current pulse is applied to the coil 54. The resistivity of the blank 61 to the passage of an induced current impulse therein is greatest at the areas of contact between the projections 64 and the surface 65 of the edge portions 63. It is at these areas that the blank 61 is tack welded at axially spaced areas by the combined effects of the heating of the edge portions 62, 63 and the radially inwardly directed forging forces. Upon the decay of the current pulse and the solidification of the metal at the interfaces of the edge portions 62, 63 the blank 61 can be advanced beyond the horn 51 and subsequent operations formed thereon, such as another type of welding to complete the seam.

The number of projections 64 in either or both of the edge portions 62, 63 of the blank 61 can be sufficiently numerous and spaced sufficiently close together so that instead of the spaced tack welds which are obtained in the manner just described, a plurality of partially overlapped tack weld areas are formed which, in effect, form a continuous unbroken weld.

Each of the apparatuses 10, 50 and the methods disclosed have been thus far described with respect to the formation of a lap weld between edge portions of the metallic sheets or blanks S, B and 61. However, the apparatuses 10, 50 as well as the disclosed methods are equally applicable to the formation of a butt weld between edge portions of a metallic sheet. For example, the distance between the edges 34, 35 of the metallic sheet S can be substantially identical to the circumference of the cavity 16 of the mold 11 of FIGURE 1. Upon such a selected dimensioning of the metallic sheet S and the closing of the mold bodies 12, 13 in the manner heretofore described, the edges 34, 35 would abut and a butt weld would result.

With respect to the metallic sheet or blank B of FIGURES 4 and 5, a butt weld between the edges (unnumbered) of the edge portions 58, 60 would result if the distance between the edges is selected to be equal to the circumference of the surface 52 of the horn 51. Upon the insertion of such a blank between the horn 51 and the coil 54, the edges thereof would be initially spaced apart and driven into abutting contact by the radially inwardly directed forging forces heretofore noted to form a butt weld.

FIGURE 7 illustrates a metallic sheet or blank 66 having edge portions 67, 68 terminating in respective beveled edges 70, 71. When the blank 66 is formed to a tubular configuration by the closing of the mold bodies 12, 13 of the mold 11, the beveled edge 71 of the edge portion 68 rides along the beveled edge 70 of the edge portion 67 to form a partial abutment between these edges with outer and inner surfaces 72, 73 respectively of the edge portions 67, 68 being radially offset as shown in FIGURE 7. Assuming that the surface 72 of the edge portion 67 is in full contact with the surface 15 of the cavity 16 and a pulse is applied to the coil 20, the radially outwardly directed forging force heretofore described urges the edge portion 68 radially outwardly and the edge portions 70, 71 into substantially full-face abutment. This same movement substantially aligns the surfaces 72 and 73 of the respective edge portions 77 and 68. This construction prevents the formation of a minute gap which might otherwise result upon the application of the forging pressure which tends to separate the edges upon the circumferential expansion of the blanks.

A blank 74 of FIGURE 8 includes end portions 75, 76 having oppositely directed burrs 77, 78 respectively. The burrs 77, 78 result when the blank 74 is slit, and upon being folded to a generally tubular configuration, the burr 77 is in line contact with an external surface 80 of the edge portion 76 while the burr 78 is similarly in line contact with an internal surface 81 of the edge portion 75, noting that the burrs 78 are spaced circumferentially from each other to define a gap or space 82 between the edge portions 75, 76. The blank 74 thus corresponds to a conventional can body blank, and can be welded by either the apparatuses 10 or 50. Since the cross-sectional area of the burrs 77, 78 is greater than the cross-sectional area of the blank 74 the resistance to current flow is higher at the overlapped edge portions 75, 76 resulting in a greater heating thereof as was heretofore noted. In the solidified weld, the gap 82 is, of course, non-existent and the burrs 77, 78 are substantially eliminated upon the fusion of the material at the interfaces of the edge portions 75, 76.

Another metallic sheet or blank 83 is shown in FIGURE 9 of the drawing and includes overlapped edge portions 84, 85 having respective opposed pebbled surfaces 86, 87 which are formed by, for example, a knurling operation. The blank 83 is welded in either of the apparatuses 10, 50 by any one of the methods heretofore described in the consideration of the formation of an overlapped or lapped weld.

This disclosure has been directed primarily to the formation of a tubular member, such as can body, however, the disclosed methods and apparatuses are equally applicable for forming articles other than can bodies or comparable articles. For example, the methods herein disclosed can be practiced to apply a conductive material to the interior of containers constructed of glass, plastic or other material capable of withstanding the necessary forging forces. This can be accomplished by forming a thin conductive sheet of material, such as aluminum foil, into a tube, and inserting the tube through a neck opening into the body of the container. A coil, corresponding to the coil 20, may then be introduced through the neck into the tube and energized in the manner described to force the tube into intimate engagement with the interior surface of the container body and weld edge portions thereof to form either a butt or lap weld, thus forming an electrically continuous lining, vapor barrier, etc.

By applying a similar conductive material in foil form to the exterior of a container and telescoping a coil, comparable to the coil 54, exteriorly of both the conductive material and the container a similarly continuous conductive covering, vapor barrier, etc. can be secured to the exterior of the container by the formation of either a lap or butt weld.

It is also within the scope of this invention to construct the horn 51 of FIGURES 4 and 5 as a conventional expandable horn of a conventional body maker to facilitate the withdrawal of a welded can body or similar tubular member therefrom.

It is also desirable to position the metallic sheets with the overlapped or butting edge portions thereof at a point diametrically opposite to the terminal portions 21, 22 and 56, 57 of the respective coils 20, and 54 to avoid any non-uniformity of the magnetic field in the vicinity of the weld area. However, variations from the desired positioning of the terminal portions of the coils relative to the edge portions of the metallic blanks are similarly considered to be within the scope of this invention.

It is also within the scope of this invention to apply periodic current pulses to the coils 20 and 54, particularly the coil 54 when employed in conjunction with a conventional can body maker. For example, the normal interval for welding a can body on a body maker operating at a production rate of approximately 400 can bodies per minute is approximately $\frac{1}{400}$ minute or $\frac{6}{1600}$ second or approximately 36 milliseconds. Since 100 microsecond pulses can be achieved by conventional electronic equipment at least 180 pulses could be applied to a coil at the rate of 5 pulses per millisecond with an equal time period between pulses.

In addition to the foregoing, the invention is not limited to conditions normally found in resistance welding where direct contact with the work by electrodes or equivalent mechanisms are necessary before current flow. Rather, the welding process can be initiated when the edge portions to be joined have come together in close proximity. In this case an arc will occur causing heating of the spaced edge portions, thereby reducing the overall cycle time as compared to resistance welding.

From the foregoing, it will be seen that novel and advantageous provision has been made for carrying out the desired end. However, attention is again directed to the fact that other variations may be made in the example metallic blanks, apparatuses and methods disclosed herein without departing from the spirit and scope of the invention as defined in the appended claims.

We claim:
1. A method of joining portions of a metallic member comprising the steps of arranging edge portions of a metallic member in contact and subjecting the metallic member to an energy field of sufficient intensity to both induce current flow in the member through the contacting edge portions whereby the same are heated and establish a force which forcefully urges the edge portions into intimate contact whereby the edge portions are joined upon subsequent cooling thereof.

2. A method of pressure welding portions of a metallic member comprising the steps of arranging edge portions of a metallic member in spaced relationship, and subjecting the metallic member to an energy field of sufficient intensity to both cause current flow in the member across the edge portions whereby the same are heated and establish a force which forcefully urges the heated edge portions into pressurized contacting relationship whereby the edge portions are joined upon subsequent cooling thereof.

3. A method of joining portions of a metallic member comprising the steps of arranging edge portions of a metallic member in edge butting contact, and subjecting the metallic member to an energy field of sufficient intensity to both induce current flow in the member through the contacting edge portions whereby the same are heated and establish a force which forcefully urges the edges into intimate pressurized contact whereby the edge portions are joined upon subsequent cooling thereof.

4. A method of joining portions of a metallic member comprising the steps of arranging edge portions of a metallic member in overlapping contact and subjecting the metallic member to an energy field of sufficient intensity to both induce current flow in the member through the contacting edge portions whereby the same are heated and establish a force which forcefully urges the edge portions into intimate contact whereby the edge portions are joined upon subsequent cooling thereof.

5. A method of pressure welding portions of a metallic member comprising the steps of arranging edge portions of a metallic member in spaced relationship, and subjecting the metallic member to an energy field of sufficient intensity to both urge the edge portions into edge butting contacting relationship and induce current flow in the member through the contacting edge portions whereby the same are heated and pressure joined upon subsequent cooling thereof.

6. A method of pressure welding portions of a metallic member comprising the steps of arranging edge portions of a metallic member in spaced relationship, and subjecting the metallic member to an energy field of sufficient intensity to both urge the edge portions into overlapping contacting relationship and induce current flow in the member through the contacting edge portions whereby the same are heated and pressure joined upon subsequent cooling thereof.

7. A method of joining portions of a metallic sheet member comprising the steps of forming a metallic sheet member into a generally tubular configuration with contacting edge portions thereof defining an area of high resistance to current flow, and subjecting the metallic sheet member to an energy field of sufficient intensity to both induce current flow in the member through the area of high resistance whereby the contacting edge portions are heated and establish a force which forcefully urges the contacting edge portions into intimate contact whereby the edge portions fuse together upon subsequent cooling thereof.

8. A method of joining portions of a metallic sheet member comprising the steps of forming a metallic sheet member into a generally tubular configuration with edge portions thereof in spaced relationship, and subjecting the metallic member to an energy field of sufficient intensity to both urge the edge portions into intimate edge butting contact defining an area of high resistance to current flow and induce current flow in the member through the area of high resistance whereby the contacting edge portions are heated and establish a force which forcefully urges the contacting edge portions into intimate contact whereby the edge portions fuse together upon subsequent cooling thereof.

9. A method of welding edge portions of a metallic sheet comprising the steps of positioning a metallic sheet of a generally tubular configuration between a support and a conductor with opposite edge portions of the sheet in opposed spaced relationship, and passing an electrical impulse through the conductor of a magnitude sufficient to establish a force which urges the sheet against the support with the edge portions in intimate contact and also induces an electrical impulse in the sheet passing between contacting surfaces of the edge portions with the contacting edge portions being heated and fused together.

10. A method of welding edge portions of a metallic sheet comprising the steps of positioning a metallic sheet of a generally tubular configuration between a support and a conductor with opposite edge portions of the sheet in contacting relationship and passing an electrical impulse through the conductor of a magnitude sufficient to establish a force which urges the sheet against the support with edge portions in intimate pressure contact and also induces an electrical impulse in the sheet passing between contacting surfaces of the edge portions with the contacting edge portions being heated and fused together.

11. A method of welding edge portions of a metallic sheet comprising the steps of positioning a metallic sheet of a generally tubular configuration in external telescopic relationship to a support and an internal telescopic relationship to a conductor with opposite edge portions of the sheet in opposed spaced relationship, and passing an electrical impulse through the conductor of a magnitude sufficient to establish a force which urges the sheet against the support with the edge portions in intimate contact and also induces an electrical impulse in the sheet passing between contacting surfaces of the edge portions with the contacting edge portions being heated and fused together.

12. A method of welding edge portions of a metallic sheet comprising the steps of positioning a metallic sheet of a generally tubular configuration in external telescopic relationship to a support and an internal telescopic relationship to a conductor with opposite edge portions of the sheet in opposed contacting relationship, and passing an electrical impulse through the conductor of a magnitude sufficient to establish a force which urges the sheet against the support with the edge portions in intimate pressure contact and also induces an electrical impulse in the sheet passing between contacting surfaces of the edge portions with the contacting edge portions being heated and fused together.

13. A method of welding edge portions of a metallic sheet comprising the steps of positioning a metallic sheet of a generally tubular configuration in internal telescopic relationship to a support and in external telescopic relationship to a conductor with opposite edge portions of the sheet in opposed contacting relationship, and passing an electrical impulse through the conductor of a magnitude sufficient to establish a force which urges the sheet against the support with the edge portions in intimate pressure contact and also induces an electrical impulse in the sheet passing between contacting surfaces of the edge portions with the contacting edge portions being heated and fused together.

14. A method of forge welding tubular members comprising the steps of forming a generally tubular metallic member by placing opposite generally parallel edge portions of a metallic sheet into overlapping relationship to form a seam area having opposed interfaces in line contact, applying a radially outwardly directed force against the interior of the tubular member to increase the volume thereof and reduce the area of interface overlap, the force being of a magnitude sufficient to urge the interfaces into intimate surface contact, and passing a current impulse between the opposed interfaces during the surface contact therebetween to heat the edge portions and forge weld the member in the seam area.

15. A method of forge welding tubular members comprising the steps of forming a generally tubular metallic member by placing opposite generally parallel edges portions of a metallic sheet into overlapping relationship to form a seam area having opposed interfaces in spaced point contact, applying a radially outwardly directed force against the interior of the tubular member to increase the volume thereof and reduce the area of interface overlap, the force being of a magnitude sufficient to urge the interfaces into intimate surface contact, and passing a current impulse between the opposed interfaces during the surface contact therebetween to heat the edge portions and forge weld the member in the seam area.

16. A method of forge welding tubular members comprising the steps of providing a metallic sheet having generally parallel opposite edge portions terminating in complementary bevelled edges, forming the sheet into a tube with the bevelled edges at least partially in contact to form a seam area having partially contacting opposed interfaces, applying a radially outwardly directed force against the interior of the tubular member to increase the volume thereof and increase the area of interface contact, by urging the interfaces into complete surface contact, and passing a current impulse between the interfaces during the complete contact therebetween to heat and forge weld the member in the seam area.

17. A method of forge welding tubular members comprising the steps of providing a metallic sheet having generally parallel opposite edge portions, pebbling opposite surface portions of the edge portions, forming the sheet into a tube with the pebbled surface portions in overapping relation to form a seam area having opposed interfaces in contact, applying a radially outwardly directed force against the interior of the tubular member to increase the volume thereof and reduce the area of interface overlap, the force being of a magnitude sufficient to urge the interfaces into intimate surface contact, and passing a current impulse between the opposed interfaces during the surface contact therebetween to heat the edge portions and forge weld the member in the seam area.

18. A method of lining the interior of a container with a continuous metallic liner comprising the steps of forming a thin sheet of metallic material into a tube having longitudinal edge portions in contact, inserting the tube into a container through an access opening thereof, and subjecting the tube to a magnetic field of a sufficient magnitude to urge the tube into contact with interior surface portions of the container and inductively heat the edge portions of the tube to form a weld thereby providing a continuous metallic liner in the container.

19. A method of covering the exterior of a container with a continuous metallic covering comprising the steps of forming a thin sheet of metallic material into a tube having longitudinal edge portions, positioning the tube in externally telescopic relationship relative to the exterior of the container and subjecting the tube to a magnetic field of a sufficient magnitude to urge the tube into contact with exterior surface portions of the container and inductively heat the edge portions of the tube to form a weld thereby providing a continuous metallic covering upon the container.

20. A method of welding portions of a metallic member comprising the steps of forming a metallic member to a generally tubular configuration by positioning opposite edge portions in adjacent relationship, positioning the tubular member between a surface and a conductor with the edge portions spaced from the surface, passing a current impulse through the conductor which induces a current impulse in the member across the edge portions with resultant heating thereof and establishes forces which drive the edge portions across the space and into contact with the surface at a time after the current impulse is induced in the member whereby the edge portions heat and fuse to form a weld.

References Cited by the Examiner

UNITED STATES PATENTS

| | | | |
|---|---|---|---|
| 2,762,892 | 9/1956 | Park | 219—8.5 |
| 2,873,353 | 2/1959 | Rudd | 219—62 |
| 2,976,907 | 3/1961 | Harvey et al. | 153—10 |
| 3,072,771 | 1/1963 | Kennedy | 219—8.5 |
| 3,258,573 | 6/1966 | Marin et al. | 219—9.5 |

RICHARD M. WOOD, *Primary Examiner.*

ANTHONY BARTIS, *Examiner.*

H. W. COLLINS, *Assistant Examiner.*